Aug. 22, 1950 A. SCHAFFER 2,519,707
COMBINATION FERTILIZER DISTRIBUTOR AND WATERING CAN
Filed Oct. 18, 1948
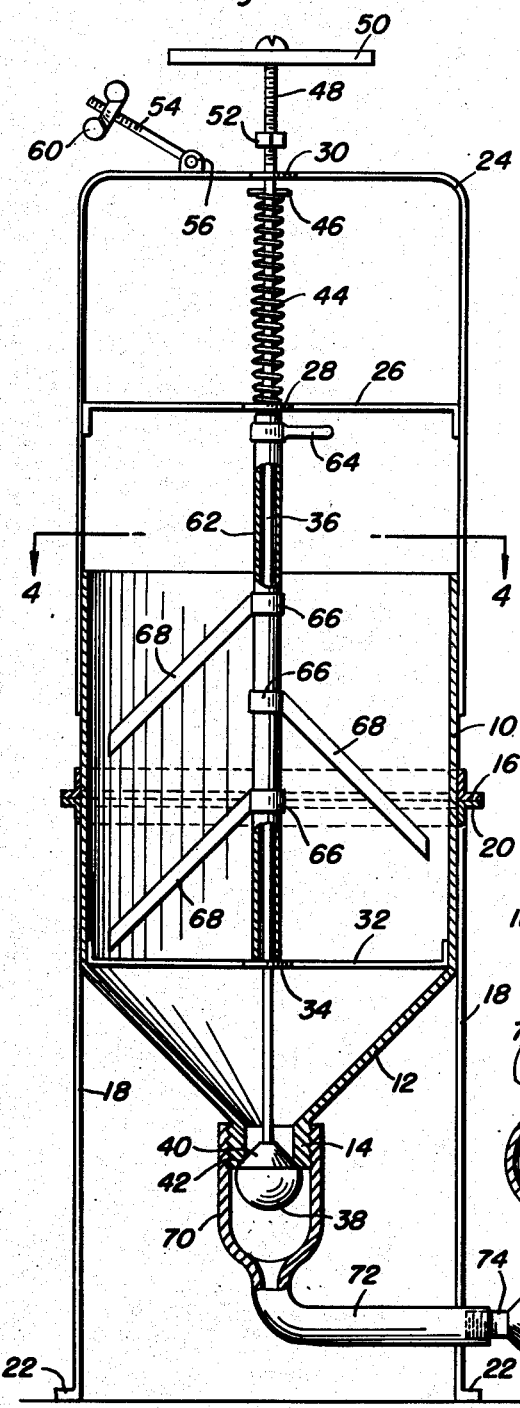
Fig. 1.
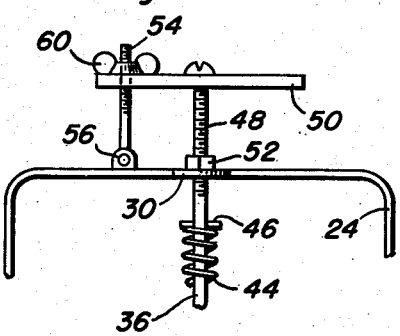
Fig. 2.
Fig. 3.
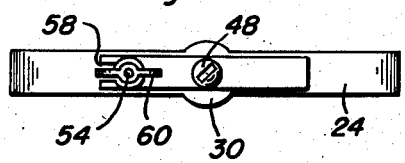
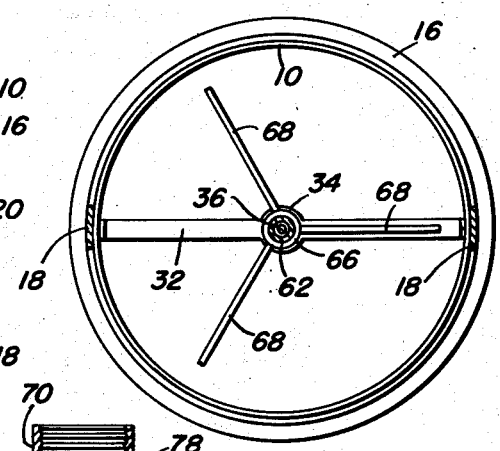
Fig. 4.
Fig. 5.
Inventor
Arthur Schaffer
By
Attorneys Patented Aug. 22, 1950

2,519,707

UNITED STATES PATENT OFFICE 2,519,707

COMBINATION FERTILIZER DISTRIBUTOR AND WATERING CAN

Arthur Schaffer, New Lisbon, N. J., assignor of one-half to Philip Rieck, New Lisbon, N. J.

Application October 18, 1948, Serial No. 55,102

6 Claims. (Cl. 222—185)

This invention relates to new and useful improvements in dispensers, and the primary object of the present invention is to provide a portable combination fertilizer distributor and watering can for use in the field, garden or the like in a convenient manner.

Another important object of the present invention is to provide a dispenser for agricultural use including a hopper having a delivery end and embodying novel and improved means, manually operated, for agitating and separating materials, such as fertilizer, grain or the like, that is placed in the hopper.

A further object of the present invention is to provide a combination fertilizer distributor and watering can having a delivery conduit so designed as to permit the roots of plants or the under surfaces of leaves to be treated.

Another feature of the present invention is to provide an apparatus for agricultural use including a hopper having a delivery end, and embodying novel and improved valve means for adjustably controlling the delivery end of the hopper.

A still further aim of the present invention is to provide a device of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, and in which:

Figure 1 is a front elevational view of the present invention, and with parts thereof broken away and shown in section for the convenience of explanation;

Figure 2 is a fragmentary front elevational view of the present invention, and showing the valve operating rod in a locked position;

Figure 3 is a top plan view of Figure 2;

Figure 4 is a transverse horizontal sectional view taken substantially on the plane of section line 4—4 of Figure 1; and, Figure 5 is a longitudinal vertical sectional view of one type of delivery conduit used in conjunction with the present invention.

Referring now to the drawings in detail, wherein for the purpose of illustration there is disclosed a preferred embodiment of the present invention, the numeral 10 represents a substantially cylindrical container or receptacle having a tapered lower portion 12 that is provided with an externally threaded outlet nipple 14.

An angle member or ring 16 embraces the container 10 and is fixed thereto in any suitable manner in order to brace the central portion of the container.

A pair of diametrically opposed legs 18 are disposed longitudinally of the container 10 and include angulated upper end portions 20 that are suitably secured to the angle member 16. The lower portions of the legs 18 project well downwardly from the tapered portion 12 and terminate in bearing feet 22.

The leg portions of a substantially U-shaped handle or bail 24 are fixed to the outer periphery of the container 10 and the said leg portions are connected and braced by a strap 26 having an enlarged, central apertured portion 28 that registers with the enlarged central apertured portion 30 at the web of the handle 24.

A further brace or strap 32 extends transversely of the container 10, adjacent the hopper or tapered portion 12, and is fixed to the inner periphery of the container. This latest brace 32 is also provided with an enlarged central apertured portion 34 aligning the portions 28 and 30.

Slidably received by the apertures in the portions 28, 30 and 34, is a valve operating rod 36 the lower end of which supports a valve 38 having a conical portion 40 that is adapted for positioning in a beveled seat 42 provided in the nipple 14.

A coil spring 44 embraces the rod 36 and is biased between the central portion 28 and a transverse pin 46 carried by the rod 36 for normally urging the rod 36 to a raised position with the valve 38 in a closed position.

The upper externally threaded end 48 of the rod 36 supports a hand grip 50 and a nut or stop 52 receivably engaged on the threaded end 48 is adjustable to limit downward sliding movement of the rod 36 and hence opening movement of the valve 38 for regulating the quantity of material discharged from the container 10.

In order to retain the valve 38 in a selected open position, there is provided a bolt 54 that is pivoted as at 56 to the web of the handle 24. This bolt 54 is adapted to be received in a notch 58 formed in the hand grip 50, and a nut 60 receivably engaged on the bolt 54 bears against the hand grip 50 holding the rod 36 downwardly against action of the spring 44.

Journaled for rotation on the rod 36 and disposed between the braces 26 and 32, is a tubular member or agitator sleeve 62 having a hand grip 64 fixed to its upper terminal.

Embracing and suitably secured to the sleeve 62, is a plurality of longitudinally spaced rings 66 each of which supports a downwardly and outwardly inclined agitator arm or blades 68.

The arms 68 are circumferentially spaced, radially disposed and longitudinally displaced in order to effectively agitate and separate materials placed in the container 10.

Receivably engaging the nipple 14, is the enlarged, internally threaded end 70 of a substantially L-shaped delivery conduit 72 the free end of which is internally threaded to receivably engage the externally threaded shank portion 74 of a spray nozzle or head 76 when the present invention is employed for dispensing liquids.

When the present invention is employed for dispensing fertilizer, seeds, grain or the like, a conduit designated generally by the numeral 78 is employed. This conduit includes an enlarged internally threaded portion 80 for engaging the nipple 14 and a downwardly inclined portion 82.

In practical use of the present invention, the same is carried by a single operator to an area for use where it is then supported upon the legs 18.

By rotating the sleeve 62, the arms 68 will agitate and separate the material in the container or hopper 10 and by forcing the rod 36 downwardly the material in the portion 12 will enter either the conduit 72 or 78, depending upon which is employed.

Of course, the bolt 54 is used to lock the valve 38 in an open position so that the material in the container 10 will be dispensed automatically without the necessity of an operator holding the rod 36 depressed.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A combination fertilizer distributor and watering can comprising a container having tapered lower portion, a handle carried by said container, a brace for said handle, a further brace for the container, said tapered lower portion having a delivery opening, a valve controlling said opening, an operating rod slidably carried by said braces and said handle for said valve, resilient means acting on said rod and normally urging said valve to a closed position, means for supporting the container in an elevated position, means for retaining said valve in a selected open position, a delivery conduit leading from said opening, and means rotatably supported on said rod and said further brace for agitating material in said container.

2. A combination distributor and watering can comprising a container having a tapered lower portion, a handle carried by said container, a brace for said handle, a further brace for the container, said tapered lower portion having a delivery opening, a valve controlling the flow of material from said opening, and operating rod slidably carried by said braces and said handle for said valve, resilient means acting on said rod and normally urging said valve to a closed position, means for supporting the container in an elevated position, means for retaining said valve in a selected open position, a delivery conduit leading from said opening, and means supported on said rod and said further brace for agitating material in said container, said last mentioned means including a tubular member embracing and slidably receiving said rod, and a plurality of circumferentially spaced, longitudinally displaced arms carried by said tubular member.

3. The combination of claim 1 wherein said means for retaining said valve in a selected open position includes a pivotal member carried by said handle, and means adjustably securing said pivotal member to said rod.

4. A combination fertilizer distributor and watering can comprising a container having an opening, a handle secured to the container, a first brace for the handle, a second brace within the container, an operating rod slidably carried by said braces and said handle, a valve mounted on said rod for controlling the flow of material from the opening, an abutment on said rod, a spring embracing the rod and biased between said first brace and said abutment for yieldingly urging the valve to its closed position, a tubular member disposed between said braces and supported on said second brace, said tubular member slidably receiving said rod and being supported on said rod for rotation, a delivery conduit extending from the container and communicating with the opening, a hand grip mounted on said rod, a threaded rod pivoted on said hand grip, said hand grip having a slot for receiving said threaded rod, a nut threaded on said threaded rod for bearing against the hand grip to retain the valve in an open position, and means mounted on said tubular member for agitating material within the container.

5. A dispenser comprising a container having a lower portion including a delivery opening, guide means carried by the container, a valve operator slidably carried by the guide means, a valve on said operator for controlling the flow of material from the delivery opening, and an agitating means journaled for rotation on said operator and actuated independently of said operator.

6. The combination of claim 5 wherein said agitating means includes a tubular member slidably receiving said operator and a plurality of arms carried by said tubular member.

ARTHUR SCHAFFER.

REFERENCES CITED

The following references are of record in the file of this patent:

UNITED STATES PATENTS

| Number | Name | Date |
|---|---|---|
| 271,242 | Hobbs | Jan. 30, 1883 |
| 963,731 | Rodgers et al. | July 5, 1910 |
| 1,314,546 | Stratton | Sept. 2, 1919 |
| 1,366,967 | Squire | Feb. 1, 1921 |
| 1,471,475 | Demuth | Oct. 23, 1923 |
| 1,752,956 | Lex | Apr. 1, 1930 |
| 1,844,246 | Fox | Feb. 9, 1932 |
| 1,883,771 | Duncan | Oct. 18, 1932 |
| 2,004,860 | Ferrari et al. | June 11, 1935 |
| 2,175,933 | Walrod | Oct. 10, 1939 |
| 2,201,222 | Branson et al. | May 21, 1940 |
| 2,320,930 | Hooper | June 1, 1943 |